United States Patent

[11] 3,570,575

[72] Inventors: Leon F. Marker, Cuyahoga Falls, Ohio; Daniel A. Meyer, Akron, Ohio
[21] Appl. No.: 747,143
[22] Filed: July 24, 1968
[45] Patented: Mar. 16, 1971
[73] Assignee: The General Tire & Rubber Company

[54] RADIAL PLY PNEUMATIC TIRE WITH HIGH ANGLE BREAKER ASSEMBLY
4 Claims, 2 Drawing Figs.

[52] U.S. Cl. .................................................. 152/361
[51] Int. Cl. .................................................. B60c 9/14
[50] Field of Search ....................................... 152/354, 355, 356, 357, 361

[56] References Cited
UNITED STATES PATENTS
2,056,012  9/1936  Madge et al. .................. 152/355
3,095,027  6/1963  Weber .......................... 152/355
3,195,602  7/1965  Keefe, Jr. ..................... 152/361X FOREIGN PATENTS
1,067,755  5/1967  Great Britain ................. 152/361

Primary Examiner—James B. Marbert
Attorneys—Frank C. Rote, Jr and Harry F. Pepper, Jr ABSTRACT: Disclosed is a radial ply tire with a circumferentially located cincture assembly composed of endless plies in which the cords of the plies are disposed at atypical, large angles relative to the crown of the tire. The cords are held within an elastomeric matrix filled with small, oriented fibers. The plies have the same stabilizing effect as do conventional "low angle" breakers; but, because of their relatively large cord angles, are more extensible. As a result, radial ply tires featuring these high angle breakers may be manufactured by conventional "hard drum" or "flat band" processes.

Patented March 16, 1971
3,570,575
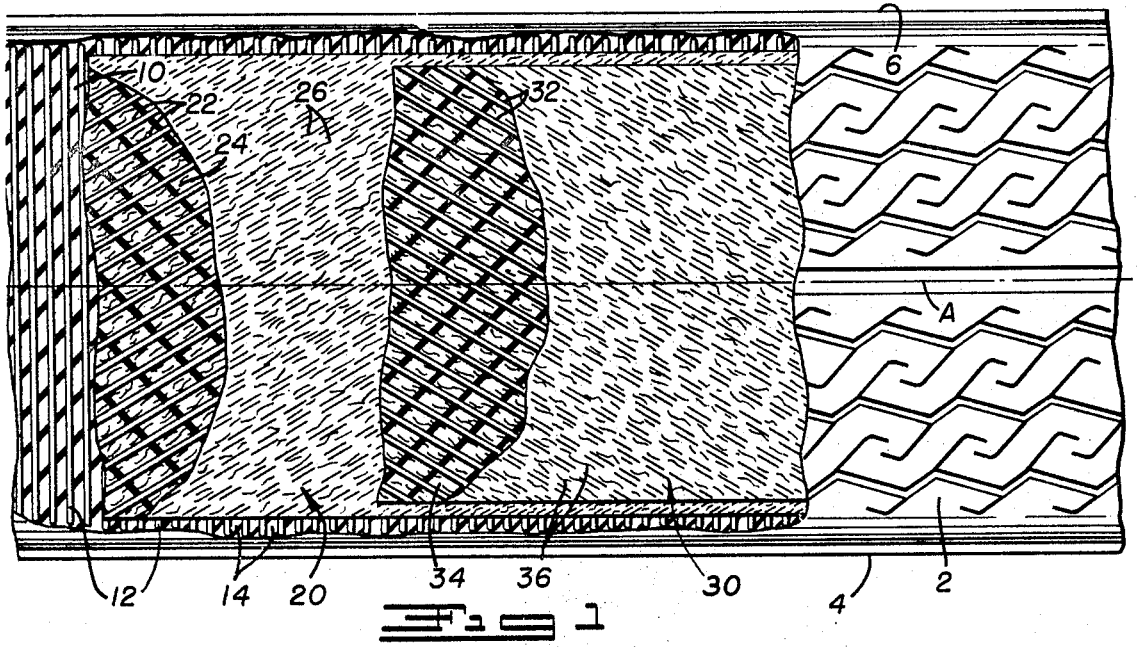
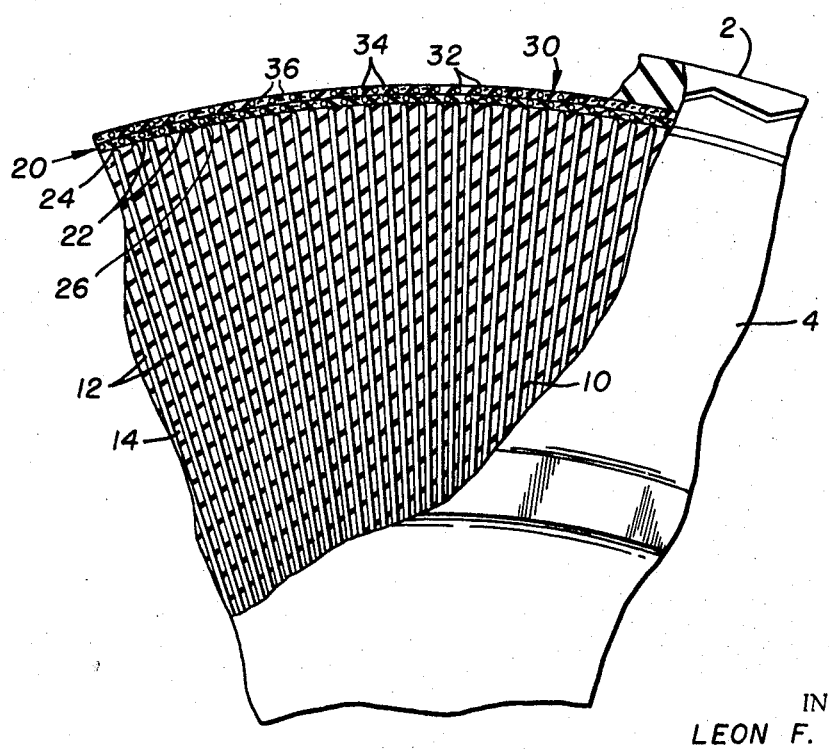
INVENTORS
LEON F. MARKER
BY DANIEL A. MEYER
Harry F. Pepper Jr.
ATTORNEY

RADIAL PLY PNEUMATIC TIRE WITH HIGH ANGLE BREAKER ASSEMBLY

BACKGROUND OF THE INVENTION

The popularity of radial ply pneumatic tires has been increasing in the United States in recent years. Recognizing this fact, tire manufacturers are making radial ply tires in greater numbers than ever before. Because the bias ply pneumatic tire has been, and still is, the most popular tire used in the United States, the manufacture of radial ply tires has presented unique problems to the American tire manufacturer.

Since the basic body design of a radial ply tire differs from that of a bias ply tire, the methods and machinery used in producing each tire are usually different. A primary problem for the tire manufacturer has been to adapt existing production techniques so as to economically satisfy demands for both tires.

The radial ply pneumatic tire is so named because the cords of the carcass extend from bead to bead across the crown of the tire substantially in a radial direction. In other words, the carcass cords of a radial ply tire cross a plane containing the circumferential centerline of a tire at an angle of approximately 90°. Tires designed with such carcasses are considered by many to be better than bias ply tires from a handling and treadwear standpoint.

However, a tire having just a radial ply carcass is very unstable in a lateral direction. Therefore, the classically designed radial ply tire includes a circumferential belt or cincture assembly in the crown area of the tire between the carcass and the tread portion to effect satisfactory lateral stability.

These belt or cincture assemblies are normally composed of endless, weftless, fabric plies in which the parallel cords of the plies are disposed at a relatively small angle with respect to the circumferential central plane of the tire. These plies are referred to by some as "belts," and by others, as "low angle breakers." A typical assembly normally includes an even number of superposed belts or breakers with the cords in one ply disposed at equal but opposite angles with respect to the cords in an adjacent ply. A well-designed belted radial ply tire usually is made so that the cords in the belts pass through the plane including the circumferential centerline of the tire at an angle between about 5 to 20°.

To provide circumferentially extending endless plies between the tread portion and carcass of a tire is not a new idea. Bias ply tires, i.e., tires with carcass cords passing through the crown at crown angles substantially less than 90°, have been made with such endless plies. A bias ply tire properly made can be, per se, as stable in the lateral direction as is a belted radial ply tire. Notwithstanding this feature, bias ply tires have been made with endless, circumferentially extending, fabric plies for several reasons. These endless plies, called breakers, will further supplement lateral stability. Breakers also function to protect carcass plies against local impacts and/or punctures, and to improve the bond between the tread portion of the tire and the carcass. Breakers, as they are used in bias ply tires, are structurally distinguishable from belts used in radial ply tires. A bias ply breaker contains rubberized cords which lie, in the finished tire, at a relatively high bias angle with respect to the circumferential central plane of the tire. This relatively high angle is usually between about 25 to 65°.

The angle of the parallel cords in these circumferential plies becomes significant when constructing the tires in which they are used. By presently existing methods, the more expandable a tire structural element, the easier the tire is to manufacture. Of the two types of endless plies discussed, the high angle breakers are more easily expanded radially. It has been found that as the angle of the cords in a breaker approach 25°, expansion becomes more difficult. Thus, belts or "low angle" breakers are considered inextensible, for all practical purposes.

Today, most bias ply tires are built by what is known in the industry as one-stage "flat band" or "hard drum" processes. These processes comprise essentially, wrapping the carcass plies about a collapsible drum, fixing the tire beads at appropriate locations at the ends of the drum, turning the carcass plies over the beads, positioning the tread and sidewall stock over the carcass and stitching down the assembly to mutually adhere the assembled components. If circumferentially extending breakers are desired, these are placed in appropriate locations over the carcass plies before placement of the tread and sidewall stock. The "green" tire is removed from the drum, then shaped and cured in a tire mold. In the mold the tire is expanded radially to its final diameter. The endless breakers can expand along with the remainder of the tire, because of the high angle of the breaker cords.

A belted radial ply tire may not be built in this way. Because the requisite belt or cincture assembly is composed of relatively inextensible breakers, this component must be built to approximately its "finished tire" diameter before curing in the mold.

Two avenues are available to solving this problem. First, modifications can be made to presently existing "one-stage" procedures. Second, the classical design of a radial ply tire may be altered slightly to permit manufacture by procedures similar to those used in the manufacture of bias ply tires.

Many modifications have been made to presently existing tire machinery in an attempt to build a radial ply tire by a one-stage process. For example, in tread Pat. application Ser. No. 423,442 filed Jan. 5, 1965, now U. S. Pat. No. 3,475,254, assigned to the same assignee as the present invention, there is disclosed a process whereby the carcass sidewalls of a radial ply tire are built at one location, while the belt or low angle breaker assembly and tread are assembled at another. An automated transfer ring subsequently transfers the finally dimensioned belt assembly and tread to a position overlying an expandable drum upon which the carcass was built. The carcass is then expanded into contact with the prebuilt belt and tread assembly. The green tire "blank," which is approximately at its final diameter, is then cured and further shaped in a mold. Such modified machinery allows for easier radial tire manufacture, but may present a large expense, particularly to small tire manufacturers.

Alternatively, there have been recent developments wherein the construction of the relatively inextensible belts have been altered so as to make them extensible during shaping. In this type of approach, radial ply tires are built according to the conventional flat band method, but the belts are initially constructed so as to allow their cords to "pantograph." The endless plies which are to form the belt assembly are constructed with relatively high angle widely spaced cords. Thus, when radial expansion takes place, these cords will move or "pantograph" to a low angle, more closely spaced relationship. Such an approach to radial tire manufacture is more fully described in U.S. Pat. application Ser. No. 658,014 filed Jul. 27, 1967, which is assigned to the same assignee as the present invention. This approach has presented some problems because extreme care is required to insure that the movement of the cords during expansion is uniform. If the cords do not move uniformly to the required low angle position, the resultant belt assembly will not serve to laterally stabilize the tire.

SUMMARY OF INVENTION

It is an object of the present invention to provide a radial ply tire having a novel cincture assembly which is composed of high angle breakers.

It is another object of the present invention to provide a radial ply tire design which readily lends itself to construction by presently existing tire building processes.

It is still another object of the present invention to provide a radial ply tire employing a high angle breaker assembly in its crown which functions substantially as a typical low angle breaker assembly.

It has been found that by providing a radial ply tire with a plurality of specially designed high angle breakers, that problems in adapting radial ply constructions to presently existing methods may be overcome. The novel high angle breaker used comprises spaced, mutually parallel, continuous cords in an elastomeric matrix reinforced by uniformly dispersed, oriented fibers. This breaker construction gives the requisite circumferential stiffness necessary for lateral stabilization of a radial ply tire. In addition, due to the high angle disposition of the cords in the breaker plies, the assembly is radially extensible. Therefore, radial ply tires employing such assemblies may be built by typical one-stage flat band processes.

BRIEF DESCRIPTION OF THE DRAWINGS

FIG. 1 is a plan view of part of a radial ply tire with parts broken away and shown in section, which is provided with a two-ply breaker assembly constructed according to the present invention.

FIG 2 is an elevation view of the tire as shown in FIG. 1 with parts omitted, broken away and shown in section.

DESCRIPTION OF A PREFERRED EMBODIMENT

Referring particularly to FIGS. 1 and 2, there is shown a portion of a radial ply pneumatic tire displaying details of a preferred embodiment of the present invention. The tire is provided with a conventional housing structure having a tread portion 2 and opposing sidewall portions 4 and 6. The housing structure is made in a conventional manner using one of the many available rubber compounds suitable for this purpose.

The frame or carcass of the tire is shown as a ply 10 with spaced, mutually parallel, radially extending cords 12 passing from sidewall to sidewall through the crown. By "radially extending" is meant that the cords 12 are disposed so as to lie at approximately an angle of 90° with respect to the circumferential centerline of the tire, represented by centerline A in FIG. 1. The disposition of the cords may be described more accurately as crossing the plane containing the circumferential centerline at substantially a 90° angle. The cords 12 are coated by and embedded within an elastomeric compound 14, shown in the spaces between the cords. Although only a single carcass ply 10 is shown in FIGS. 1 and 2, it is to be understood that carcasses comprising several plies with radially extending cords may be used. The cords may be of any of the high-strength materials found suitable for carcass ply construction. For example, the cords 12 may be nylon, rayon, polyester, cotton, glass or metal.

Between the body ply 10 and the tread 2 is a circumferentially extending two-ply breaker assembly composed of an inner breaker 20 and an outer breaker 30. The outer breaker 30 comprises spaced, mutually parallel, continuous cords 32 in an elastomeric matrix 34. The matrix 34 contains uniformly dispersed, short fibers 36. The cords 32 cross the plane containing the circumferential centerline A at a relatively high angle of between about 25° to about 65°. The inner ply 20 is similar in construction to outer ply 30 and it is composed of cords 22 held within an elastomeric matrix 24 containing uniformly dispersed fibers 26. The cords 22 of ply 20 are disposed at an equal but opposite angle with respect to the cords 32 of outer ply 30. It is preferred that in a two-ply breaker assembly as shown, the outer ply 30 be slightly narrower than the inner ply 20. Although a two-ply breaker is specifically featured in FIGS. 1 and 2, it is understood that the breaker assembly may include a greater number of plies. For example, four- and six-ply assemblies may be used.

The fibers 26 and 36 are oriented substantially parallel to the cords in each of the respective plies. This direction is preferred to facilitate forming of the breakers, as will be hereinafter discussed. These additional filaments serve to supplement certain desired directional stiffness requirements in each of the breakers 20 and 30, particularly stiffness in the circumferential direction. The filaments 26 and 36 may be oriented in directions other than parallel with the cords, if desired. However, it is best that the fibers in the ply be oriented rather than in a random arrangement. The fibers 26 and 36 are preferably discrete filaments of nylon, rayon, polyester, cotton, glass or metal.

It is contemplated that the cords in each breaker of a breaker assembly are of the same material. Also, it is preferred that the fiber material, although possibly different from the cord material in a given ply, be the same in all plies. Alternatively, however, the cord and fiber materials can vary in each ply of a given breaker assembly in situations where a "stepped" modulus may be desired. In other words, a breaker assembly can be made with breakers of different moduli by varying the cord and/or fiber material in the respective breakers.

The fiber reinforced ply stock from which breakers such as 20 and 30 may be cut, is made by adding fibrous material with an elastomeric compound to a conventional mill which serves to uniformly disperse the fibers throughout the compound. The amount of milling time required depends upon the uniformity of the dispersion of filaments desired. The milling time also depends upon the specific type of filament material added and upon the kind of elastomeric compound used. It should be noted that during milling the fibers will generally decrease in length. However, after a certain number of milling passes an "equilibrium" length will be reached. This equilibrium length is different for different fibers. For example, the equilibrium size for glass is about 0.020 inch. It is preferred that enough milling passes be made to reach equilibrium length and that substantially all of the fibrous component be presently only as discrete filaments. However, it is sufficient to stop milling when it appears that most of the reinforcement is present as discrete filaments.

It is more advantageous that all of the fibers used to reinforce a given elastomeric matrix be of the same material. This is because milling physically affects one material differently than another. For example, when reinforcing with a mixture of fibers, one type will break up differently and reach its equilibrium length at a different time than another type. However, there are some advantages to mixing different fibers in a given compound, notably, cost reduction.

For a more detailed description of basic procedures used in manufacturing ply stock containing fibrous reinforcement, reference is made to applicants' copending application, Ser. No. 708,006, which is assigned to the same assignee as the present invention.

The filament filled compound may then be withdrawn from the mill and directly calendered upon continuous lengths of cords wherein the calendering operation will serve to orient the fibers dispersed throughout the compound in a direction parallel to the lengths of the cords. As mentioned previously, it may be desirable to orient the filament material in a direction other than parallel to the cord lengths. To make ply stock in this way, the filament filled compound should be calendered separately after milling to initially orient the filaments in a given direction. The mutually parallel lengths of cords are then topped with this preoriented filament filled sheet of compound in such a way that the filaments remain in their initially oriented direction. Thus, by different combinations of filament orientation and/or cord orientation, plies may be constructed which exhibit selected combinations of various directional strengths. Ply stock with uniformly dispersed filaments oriented parallel to the cords is preferred, since this design allows omission of an extra calendering step.

Plies of desired length are then cut from this ply stock. The cuts are made on a bias to form breakers with the desired angular disposition of cords.

A circumferential breaker assembly with breakers composed of high angle cords in an elastomeric matrix reinforced with filaments has been found to exhibit initially the same stiffness as low angle breakers in an elastomeric matrix containing no reinforcement. Thus, from a qualitative standpoint these high angle, filament reinforced breakers may be used in a radial ply tire as a substitute for the classically featured belt or low angle breaker.

To demonstrate that the high angle, filament-reinforced breakers will function as well as a belt or low angle breaker, the following comparative tests were run. Two breaker segments were prepared—one with rayon cords disposed at a 15° angle to the longitudinal dimension of the segment; the other, with rayon cords at a 30° angle to the longitudinal. The cords in each segment were embedded in identical rubber compounds, with the 30° segment containing reinforcement in the form of short oriented glass fibers. The forces required for increasing elongations in a longitudinal direction for each segment is seen in the following table:

TABLE

| Percent elongation | Load in lbs.[1] | Load in lbs.[2] |
|---|---|---|
| 1.0 | 6.0 | 7.5 |
| 1.5 | 9.5 | 11.0 |
| 2.0 | 13.5 | 15.2 |
| 2.5 | 17.4 | 19.0 |
| 3.0 | 21.5 | 23.0 |
| 3.5 | 25.7 | 26.5 |
| 4.0 | 29.7 | 29.6 |
| 4.5 | 33.5 | 33.2 |
| 5.0 | 37.6 | 36.5 |

[1] For 15° cord in conventional compound.
[2] For 30° cord in glass-fiber, filled compound.

The data in the above table clearly shows that the cord angle of about 30° when combined with the fiber filled rubber compound will give an assembly having a stiffness better or equivalent to that of a 15° cord angle laid in a rubber compound containing no reinforcement.

Thus, breakers designed according to this invention will not only laterally stabilize a radial ply tire, but their use in lieu of "low angle" breakers will permit manufacture of a radial ply tire by existing one-stage processes. The high angular disposition of the breaker cords will allow radial expansion of the drum assembled "green" tire during the shaping and molding step.

Obvious modifications which can be made relative to the foregoing description are intended to fall within the scope of the invention, which is to be measured by the appended claims.

We claim:

1. A radial ply tire built and cured by conventional techniques used to build and cure bias ply tires wherein said radial ply tire comprises a circumferentially disposed breaker assembly between the carcass and tread portion of the tire, said assembly consisting of a plurality of endless breakers, each of said breakers comprising an elastomeric matrix containing:
  a. spaced, mutually parallel, continuous lengths of cord disposed at a large angle relative to the plane containing the circumferential centerline of the tire;
   1. said large angle being of a preselected magnitude no less than 25° and no greater than 65°; and
  b. uniformly dispersed, discrete filaments oriented in a predetermined direction relative to the disposition of said lengths of cord.

2. The radial ply tire as defined in claim 1, wherein said filaments are oriented in a direction substantially parallel to the disposition of said lengths of cord.

3. The radial ply tire as defined in claim 1, wherein said filaments are of a material selected from the group consisting of nylon, rayon, polyester, cotton, metal and glass.

4. The radial ply tire as defined in claim 2, wherein said filaments are of a material selected from the group consisting of nylon, rayon, polyester, cotton, metal and glass.